United States Patent [19]

Dyson

[11] Patent Number: 5,050,212

[45] Date of Patent: Sep. 17, 1991

[54] METHOD AND APPARATUS FOR VERIFYING THE INTEGRITY OF A FILE STORED SEPARATELY FROM A COMPUTER

[75] Inventor: Patrick Dyson, Mountain View, Calif.

[73] Assignee: Apple Computer, Inc., Cupertino, Calif.

[21] Appl. No.: 540,960

[22] Filed: Jun. 20, 1990

[51] Int. Cl.$^5$ ............................. G06F 7/02; H04L 9/32
[52] U.S. Cl. ............................................. 380/25; 380/4; 380/49; 340/825.31; 340/825.34
[58] Field of Search ................... 380/4, 25, 49, 23, 50; 364/285.4, 285.2, 283.1, 222.81, 260.81, 962, 949.7, 200, 900; 340/825.31, 825.34

[56] References Cited

U.S. PATENT DOCUMENTS 4,933,969 6/1990 Marshall et al. ...................... 380/49

OTHER PUBLICATIONS

Datamation, p. 160, Schwartz, (1983), "Other Uses for the MAC".

Primary Examiner—Bernarr E. Gregory
Attorney, Agent, or Firm—Mark Aaker

[57] ABSTRACT

A method and apparatus for verifying a file stored separately from a computer to be identical with a previous version of the file, before using the file. This verification is done by following a defined procedure to generate a first identifier based on the contents of the previous version of the file, storing this identifier locally on the computer, and storing the file at a separate storage location. Then, at a later time, an unverified second file is retrieved from the separate storage location, the same defined procedure is followed to generate a second identifier, and the first and second identifiers compared to identify a match that verifies the integrity of the second file.

6 Claims, 2 Drawing Sheets

FIG_1 (PRIOR ART)
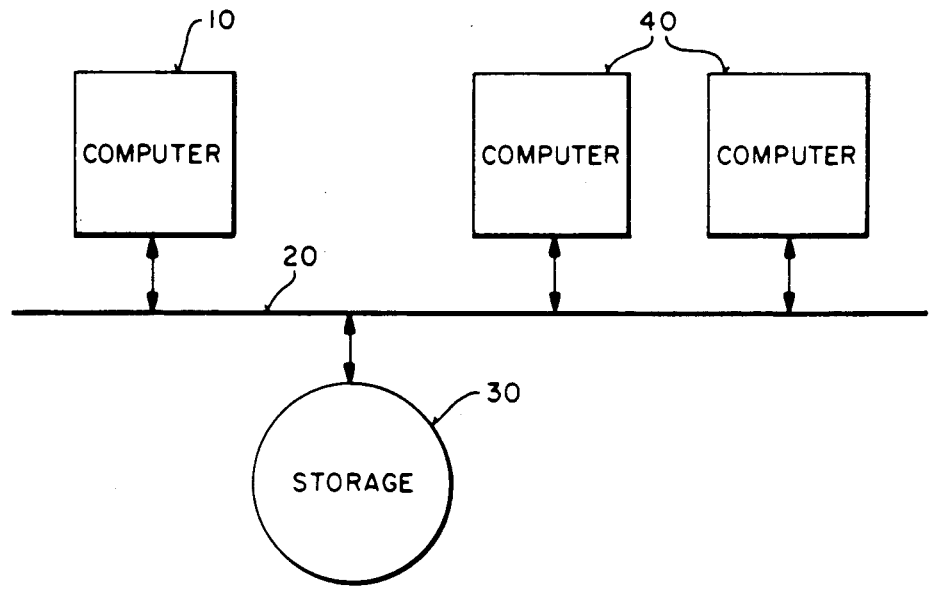
FIG_3
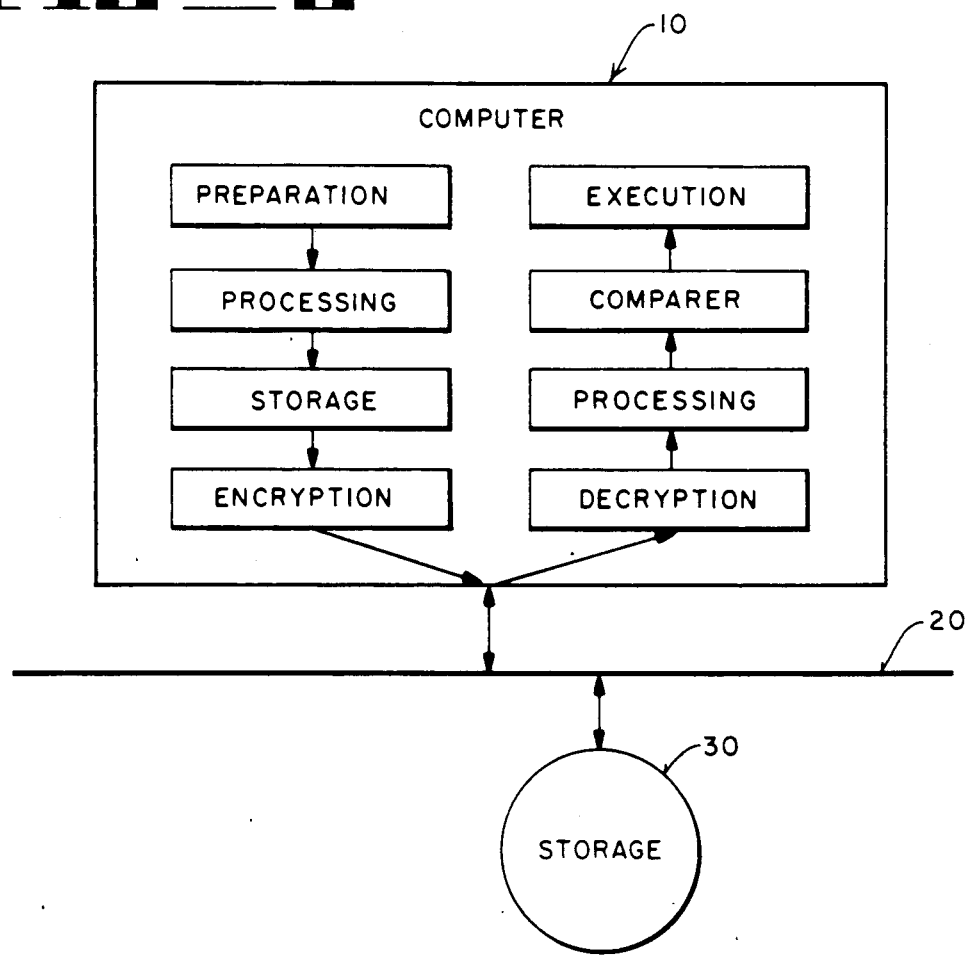

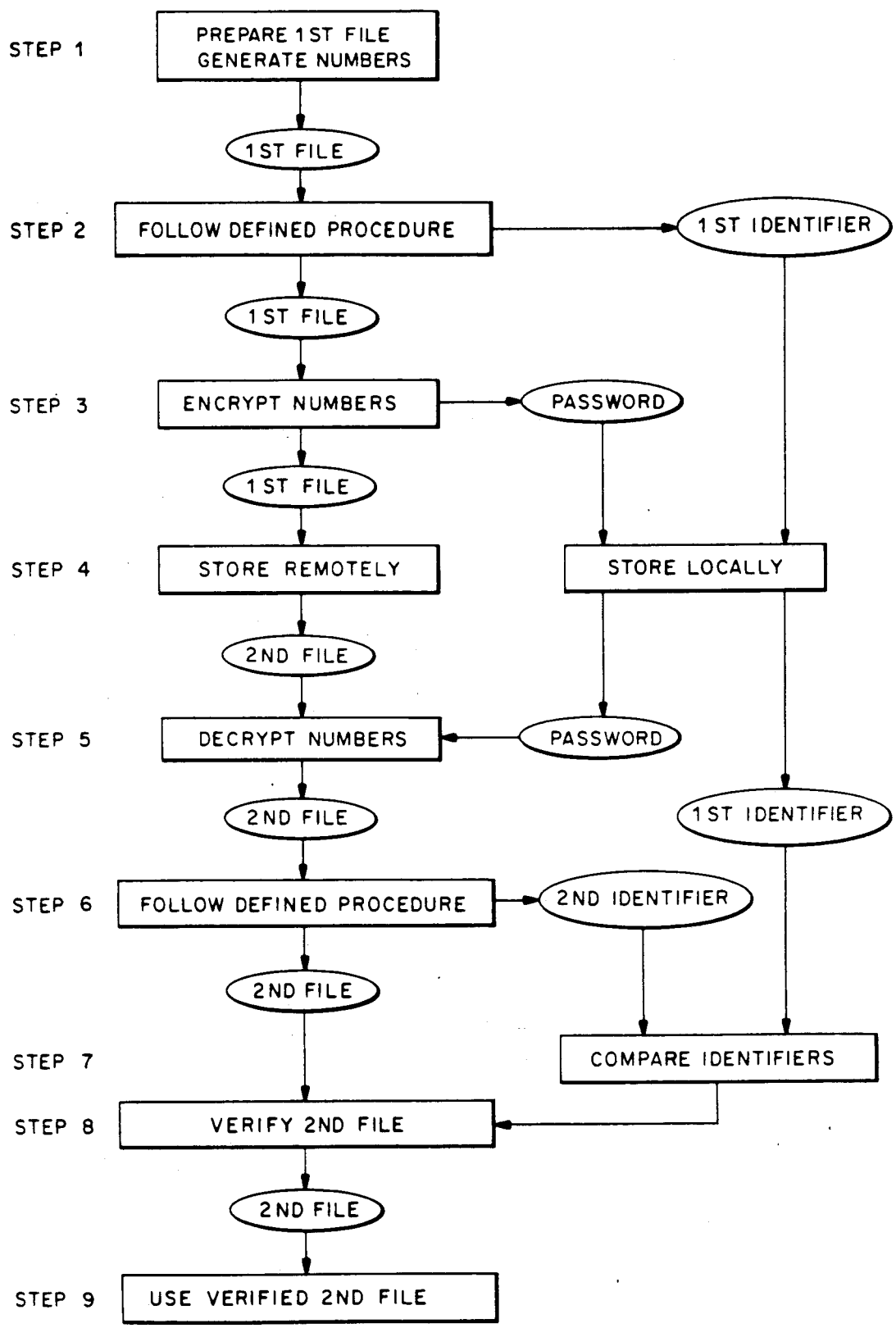

METHOD AND APPARATUS FOR VERIFYING THE INTEGRITY OF A FILE STORED SEPARATELY FROM A COMPUTER

BACKGROUND OF THE INVENTION

This invention relates to a computer receving a file from a communication network or separate storage location. In particular, the invention provides a method for verifying the file to be identical with a previous version of the file before using the file.

It is desired that files to be used by a computer do not contain errors or alterations, either accidental or intentional. Accidental changes can occur as a file is retrieved from a storage location or transmitted over a communication network. Intenational changes can occur due to changes inserted into files as "patches," or with malicious intent to disrupt operations as with computer "viruses." Such alterations can cause erroneous data, loss of data, and unexpected or uncontrolled operation, or "crashes." While a "checksum" is often used to protect the integrity of data being sent across a communication link, a checksum does not protect against alteration of the contents of a file and alteration of its checksum, and the checksum is transmitted across the link, and so can be easily intercepted and altered.

Particularly sensitive to alteration are the portions of software used in the initial start-up of a computer, which initialize and establish a functioning operating system on the computer. During this start-up, or "boot" time, critical software elements are being established in the computer. This problem is particularly troublesome for a computer that obtains its "boot image" or initial executable file over a communication network or from a separate storage location, since it cannot know what changes might have occurred to the file while it was separated from the computer or while the computer was turned off. Methods are known to verify the identity of a single communicating partner, but where a "broadcast" network, and a "server" communicating with several computers is involved, it is desirable to verify the integrity of the file received before using it for data or executable instructions.

SUMMARY OF THE INVENTION

This invention provides a method and apparatus for verifying a file stored separately from a computer to be identical with a previous version of the file before using the file. This verification follows a defined procedure to generate a first identifier based on the contents of a first file, storing this identifier on the computer, and storing the first file at a separate storage location. Then, at a later time an unverified second file, which is believed to be identical to the first file, is retrieved from the separate storage location. The same defined procedure is followed to generate a second identifier based on the contents of the second file, and the first and second identifiers compared to identify a possible match that verifies the integrity of the second file. Any accidental or intentional tampering with the file while it stored away from the computer will change the derived identifier when it is retrieved. This allows files to be stored on a less secure server, and transmitted over a broadcast network, while allowing the integrity of the file to be checked before it is used.

BRIEF DESCRIPTION OF THE DRAWINGS

FIG. 1 shows a block diagram of a computer network for the practice of this invention.

FIG. 2 shows a flow diagram of steps taken to practice the method of this invention.

FIG. 3 shows a block diagram of an apparatus for the practice of this invention.

DETAILED DESCRIPTION

FIG. 1 shows a block diagram of a computer network for the practice of this invention. A computer 10 is connected by a communication network 20 to a separate storage location 30. Additional computers 40 can be connected to the communication network 20. Configurations such as FIG. 1 are known in the field of computers.

Computer 10 is a computer such as a personal computer or workstation, which can be of large or small size, and is characterized by its need for a file of data and executable instructions in order to control its operations. The invention of this application will be particularly valuable when computer 10 does not have a large local storage device such as a hard disk, but stores and retrieves its files from separate storage location 30. Computer 10 has at least a small amount of non-volatile local storage such as EEPROM, batterybacked RAM, or local disk storage, for retaining information relevant to its operation such as the clock or local time, the computer's identity on the communication network, and other parameters. In this invention, this local storage is used to store the first identifier based on the contents of a first version of the file.

Communication network 20 can be a local area network such as Ethernet (registered trademark of Xerox Corporation), or a peripheral bus such as SCSI (Small Computer System Interface as defined by the American National Standards Institute), for connecting to separate storage location 30.

Separate storage location 30 could be another computer similar to computer 10 but with a large local storage device such as a hard disk, or could be a specialized server for the storage and recall of data. In the practice of this invention, files will be stored here for later recall by computers on the communication network 20.

Additional computers 40 can be similar to computer 10, or could be of other types. The invention of this application is particularly advantageous when the computers are of the same type, and a single file can be broadcast from separate storage location 30 across communication network 20 to many computers at once. Since such a broadcast could be originated from other than separate storage location 30, it is important that a computer 10 can verify the integrity, or freedom from alteration, of a file received from the communication network 20.

FIG. 2 shows a flow diagram of steps taken to practice the method of this invention, a method for verifying the integrity of a file that has been stored separately from a computer. In a preferred embodiment this method is called a "file integrity check," or where the file is the initial executable file for starting the computer, a "boot protocol integrity check." It allows a computer to store and retrieve a file on a remote server over a network. Upon retrieval, an integrity check is performed to detect modification of the file before the computer uses the file, which can be at "boot" time in order to initialize the operations of the computer.

In FIG. 2, Step 1 shows preparing a first file for the computer. This could be a file containing data, or could be an executable file as distributed as an executable software product, or produced as the output of software development programs such as a compiler, linker or loader. In a preferred embodiment, a header is prepended to a body containing the data or instructions to form a file. The header is useful to carry information about the file, and includes two 32 bit random numbers generated as part of the header creation.

Step 2 shows following a defined procedure to generate a highly unique first identifier based on the contents of the first file. Preferred methods of generating the identifier perform a "hash" function such as described in "Secrecy, Authentication, and Public Key Systems" by Ralph C. Merkle, UMI Press, 1982 (see particularly Chapter 2, "One-Way Hash Functions.") The Xerox Secure Hash Function (entitled "Snefru") is a one-way hash function which can be used to generate a highly unique identifier for the file, somewhat like a cyclic-redundancy-check. It is described as a cryptographically secure one-way hash function also known as a message digest, fingerprint, or manipulation detection code. The identifier produced can be called a "signature" or "check value." Another suitable function for providing unique identifiers would be would be the RSN code. These and other hash functions are known for providing a unique identifier of a piece of data. It is known to use hash functions for building an index to items stored within a database, however it is believed that their use in verifying the integrity of a file stored separately from a computer is new. In a preferred embodiment, the header and body of the first file are run through the Xerox Secure Hash Function to generate a 128 bit identifier.

The first identifier is stored locally on the computer. This requires storing the 128 bit identifier in non-volatile local storage where it can be recovered later, for example, during the next initialization of the computer. Retrieval from local storage could include reading a small amount of data from a local removable disk drive, or from a data card or card access device.

Step 3 shows that in a preferred embodiment the two 32 bit random numbers in the header are encrypted with a password stored locally at the computer. The purpose of encrypting the random number portion in the header is to increase the security against a malicious third-party listener. If the header was left completely in the clear, a third-party could monitor the transmission or retrieve the file, compute the identifier value, and, if computationally tractable, generate an altered file with the same resulting identifier value. By securing a part of the file through encryption, the third-party cannot see the original file or calculate the original identifier, and thus cannot easily generate an altered file that will produce the same identifier.

Step 4 shows that the first file is stored at a storage location separate from the computer. For example, referring back to FIG. 1, the file can be sent from computer 10, over communication network 20, to separate storage location 30. The file is now stored for later retrieval.

Step 5 shows at a later time, retrieving from the separate storage location an unverified second file. For example, at "boot" time the executable file is retrieved from the separate storage 30 and transferred across the communication network 20 to computer 10. In the preferred embodiment, the random number portion of the header of the file is decrypted with the password which was stored locally.

Due to the passage of time, and separation in distance, the computer 10 cannot be sure that the file has remained unaltered, and is suitable for safe use or execution. Therefore, Step 6 shows that prior to using the unverified second file, it is subjected to the same defined procedure as in Step 2 to generate a highly unique second identifier based on the contents of the unverified second file.

Step 7 shows comparing the first and second identifiers, to identify a possible match that would verify the integrity of the second file, that is, that the contents of the second file are identical with the contents of the previous first file. The match of the identifiers indicates to a high degree of probability that the files are identical, a degree dependent upon the uniqueness of the procedure applied to generate the identifiers, and the strength of the procedure in detecting changes and resisting intentional attempts to fool the procedure.

Step 8 shows verifying the second file on the computer. If the first and second identifiers have matched, it is safe to use or execute the second file, as safe as it was to use the first file. If the identifiers do not match, the second file is not verified, and the file can be rejected, or other error-handling steps initiated.

Step 9 shows using the verified file on the computer, for example by using the data, or by using the file to "boot" the computer.

In a preferred form of the invention, the steps and defined procedures to implement the invention are stored within local storage of the computer, such as read-only-memory (ROM), or read from a local removable disk drive during the start-up process.

FIG. 3 shows a block diagram of an apparatus for the practice of this invention.

An apparatus according to this invention, for verifying the integrity of a file that has been stored separately from a computer, includes a computer and a separate storage. The computer includes a preparation means, processing means, and storage means. In the preferred embodiment, it also includes an encryption means. The computer further includes a comparer means and execution means. And in the preferred embodiment, further includes a decryption means.

The preparation means, such as a program. compiler, linker or loader, is adapted for preparing a first file for the computer. In a preferred embodiment, a file has a header and a body, with the header including a selected random number portion.

The processing means, such as a microprocessor or larger central processing unit, is adapted for following a defined procedure to generate a first identifier based on the contents of the first file. More specifically, this would entail executing a program for calculating a one-way hash function of the file in order to generate a first identifier.

The storage means, such as local non-volatile memory or hard disk storage, is adapted for storing the first identifier on the computer.

In the preferred embodiment, the encryption means, such as a data encryption standard (DES) program, is adapted for encrypting the random number portion of the header of the first file with a password stored on the computer, and replacing the encrypted portion back into the header of the file.

The separate storage means is separate from the computer, such as a file server or separate hard disk. The separate storage means is adapted for storing the first file at a storage location separate from the computer; and at a later time, returning an unverified second file to the computer.

The computer further includes a comparer means and execution means. And in the preferred embodiment, further includes a decryption means.

In the preferred embodiment, the decryption means, such as the previously mentioned DES program, is adapted for decrypting the encrypted random number portion of the header of the unverified second file with the password stored on the computer, and replacing the decrypted random number back into the header.

The previously described processing means would again follow the defined procedure to generate a second identifier based on the contents of the unverified second file.

The comparer means, such a hardware or software comparison function, is adapted for comparing the first and the second identifiers, to identify a match which verifies the integrity of the second file.

The execution means, which could be identical or separate from the processing means, is adapted for using or executing the now-verified second file.

Clearly, other configurations of computers, computer systems, and computers connected by communication networks could serve as the apparatus for the practice of this invention. Also, it should be understood, that this invention can be practiced using both hardware and software elements in varying combinations.

These and other embodiments can be practiced without departing from the true scope and spirit of the invention, which is defined by the following claims.

What is claimed is:

1. A method for verifying the integrity of a file stored separately from a computer, comprising:
   preparing a first file for said computer, said file including a header and a body, said header including a selected number portion;
   following a defined mathematical procedure to generate a unique first identifier based on the contents of said first file;
   storing said first identifier on said computer;
   encrypting said selected number portion of said header of said first file with a password stored on said computer;
   storing said first file at a storage location separate from said computer;
   at a later time, retrieving from said storage location an unverified second file;
   decrypting said selected number portion of said header of said unverified second file with said password stored on said computer;
   following said defined mathematical procedure, generating a unique second identifier based on the contents of said unverified second file;
   comparing said first and said second identifiers to identify a possible match which would verify the integrity of said second file; and
   using the verified said second file on said computer.

2. A method as in claim 1 in which said defined mathematical procedure comprises calculating a manipulation detection code.

3. An apparatus for verifying the integrity of a file that has been stored separately from a computer, comprising:
   a computer including a preparation means, processing means, storage means, and encryption means, wherein
   said preparation means for preparing a first file for said computer, said file including a header and a body, said header including a selected number portion;
   said processing means for following a defined mathematical procedure to generate a unique first identifier based on the contents of said first file;
   said storage means storing said first identifier on said computer; and
   said encryption means for encrypting said selected number portion of said header of said first file with a password stored on said computer;
   separate storage means for storing said first file at a storage location separate from said computer; and at a later time, returning to said computer from said storage location an unverified second file;
   said computer further comprising decryption means, comparer means and execution means, wherein
   said decryption means for decrypting said selected number portion of said header of said unverified second file with said password stored on said computer;
   said processing means for following said defined mathematical procedure to generate a unique second identifier based on the contents of said unverified second file;
   said comparer means for comparing said first and said second identifiers, to identify a match which verifies the integrity of said second file; and
   said execution means for using the now-verified said second file on said computer.

4. An apparatus as in claim 3 in which said defined mathematical procedure comprises a procedure to calculate a manipulation detection code.

5. A method for verifying the integrity of a file stored separately from a computer, comprising:
   preparing a first file for use on said computer;
   executing a defined mathematical procedure to generate a unique first identifier based on the contents of said first file;
   storing said first identifier on said computer;
   encrypting a selected number portion of said first file with a password stored on said computer;
   storing said first file at a storage location separate from said computer;
   at a later time, retrieving from said storage location an unverified second file;
   decrypting a same said selected number portion of said unverified second file with said password stored on said computer;
   executing said defined mathematical procedure to generate a unique second identifier based on the contents of said unverified second file;
   comparing said first and said second identifiers to identify a possible match that verifies the integrity of said second file; and
   using the verified said second file on said computer.

6. A method as in claim 5 in which said defined mathematical procedure comprises calculating a manipulation detection code.

* * * * *